United States Patent [19]

Penchev et al.

[11] 4,216,064
[45] Aug. 5, 1980

[54] METHOD OF ASSESSMENT OF THE EFFECT OF CURRENT PERIODICAL POLARITY INVERSION IN ELECTROCHEMICAL PROCESSES

[75] Inventors: Peter R. Penchev; Stoyan S. Gishin, both of Sofia, Bulgaria

[73] Assignee: Komitet po Transportno Mashinostroene, Sofia, Bulgaria

[21] Appl. No.: 45,398

[22] Filed: Jun. 4, 1979

[30] Foreign Application Priority Data

Jun. 6, 1978 [BG] Bulgaria .................................. 39984

[51] Int. Cl.² ...................... C25D 13/00; C25D 13/06
[52] U.S. Cl. ...................................... 204/1 T; 204/78; 204/149; 204/181 R; 204/299 EC
[58] Field of Search ............... 204/1 T, 195 R, 195 C, 204/149, 181, 299 EC, 78, 79, 80, 231

[56] References Cited

U.S. PATENT DOCUMENTS

| 3,067,123 | 12/1962 | Huber | 204/231 |
|---|---|---|---|
| 3,627,661 | 12/1971 | Gordon et al. | 204/181 R |
| 3,658,676 | 4/1972 | DeVittorio et al. | 204/181 R |
| 3,676,316 | 7/1972 | Domokos et al. | 204/181 R |
| 3,766,042 | 10/1973 | Wilson | 204/195 C |
| 4,146,437 | 3/1979 | O'Keefe | 204/1 T |

*Primary Examiner*—Arthur C. Prescott

[57] ABSTRACT

Method of assessing the effect of periodic inversions of current polarity in electrochemical processes. The method comprises the reading and recording of the variation of the shape and magnitude of the current, the variation of the voltage, the variation of the active internal resistance, and the variation of the electrode potentials during the forward and inverse current intervals and during the transitional regimes of current polarity inversion.

1 Claim, No Drawings

METHOD OF ASSESSMENT OF THE EFFECT OF CURRENT PERIODICAL POLARITY INVERSION IN ELECTROCHEMICAL PROCESSES

This invention relates to a method of assessment of the effect of periodic inversion of D.C. current polarity in electrochemical processes. Such method is applicable in the electroforming of accumulator plates; the charging of Fouire plate and "Exide" accumulator batteries; the electrochemical oxidation of dimethylketone sorbose in the production of a Vitamin-C; the electropurification of process waters; and the electrodeposition of coatings.

There is known a method for the accelerated electroforming of accumulator plates using a constant current with a periodical inversion of its polarity, in which, after switching on the current, an electrochemical oxidation of the positive electrode and a reduction of the negative electrode is accomplished, and after the switching off of the current the contents of spongy lead and of lead dioxide are recorded as by percents.

A disadvantage of the above said method consists of the requirement of performing the complete electrochemical process, which often occupies dozens of hours. Another disadvantage is that the effect must be established by means of additional analytical methods as, for example, a chemical method in determining the contents of spongy lead and of lead dioxide. Moreover, both the electrochemical processes and the methods of recording the effect, are labor-consuming, entail significant amounts of time, and require the use of additional specific apparatuses for the carrying out of the chemical analyses. Such analyses are also difficult, as is the creation of conditions and parameters of the electrochemical systems in order to provide for repeatability.

The object of this invention is to provide a simplified method of assessment of the effect of the periodical inversion of current polarity in electrochemical processes, in which the time for carrying out the assessment is significantly reduced.

This object is accomplished by the method of the invention, in which: the shape and magnitude of the current, are read and recorded, the voltage, the active internal resistance and the electrochemical potentials during the forward and inverse current intervals are read and recorded, and such values are also read and recorded during transitional regimes of current polarity inversion.

The advantage of this method is, that the measuring of a single parameter under control and the recording of its variation are sufficient for the assessment of its influence in the electrochemical process. The variation of the controlled parameters can be conveniently and quickly recorded through a conventional recorder and, accordingly, its influence on the electrochemical processes at different values of the current both in forward and inverse directions, at different concentrations of the electrolyte and of solutions, and at different shapes of the current, can be established immediately.

A preferred embodiment of the method according to the invention is described below:

Three positive and four negative accumulator plates are welded together and arranged in formative baths containing a solution of sulphuric acid, $d=1$, 100 g/cm$^3$. A constant D.C. current with a periodical inversion of its polarity at a period of the formative (charging) current of 1 min, and a period of discharging current of 5 sec., is admitted therethrough. After 2–3 cycles of charging and discharging, the variation of the current, or of the voltage during the periods of charging and of discharging current, is automatically recorded. Immediately thereafter, the duration of the periods of current flow in opposite directions is changed and the variations of the parameters under control are recorded and analyzed once more. This variation automatically demonstrates the effect of current polarity inversion, and more particularly, the effect of the duration of the periods of charging and discharging current, on the variation of the active resistance in the formative baths.

Variations of the charging current, discharging current and active internal resistance as functions of the variation of the charging current period, discharging current period, shape of transitional regimes and shape of the current employed, are read immediately, with constant parameters of the electrochemical system—with a chemically identical paste, with one and the same charging current, and with one and the same arrangement of the electrodes.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

We claim:

1. A method of assessment of the effect of the periodic inversion of D.C. current polarity in electrochemical processes, comprising reading and recording the variation of the shape and of the magnitude of the current, the variation of the voltage, the variation of the active internal resistance, and the variation of the electrode potentials during the forward and inverse current intervals and during the transitional regimes of current polarity inversion.

* * * * *